United States Patent
Orlov et al.

(10) Patent No.: US 12,248,325 B2
(45) Date of Patent: Mar. 11, 2025

(54) MOBILE ROBOT AND A METHOD FOR CONTROLLING THE MOBILE ROBOT

(71) Applicant: YANDEX SELF DRIVING GROUP LLC, Moscow (RU)

(72) Inventors: Vsevolod Nikolaevich Orlov, Zhukovskiy (RU); Aleksey Viktorovich Lavrenyuk, Elektrostal (RU)

(73) Assignee: Y.E. Hub Armenia LLC, Yerevan (AM)

( * ) Notice: Subject to any disclaimer, the term of this patent is extended or adjusted under 35 U.S.C. 154(b) by 382 days.

(21) Appl. No.: 17/966,999

(22) Filed: Oct. 17, 2022

(65) Prior Publication Data
US 2023/0122066 A1    Apr. 20, 2023

(30) Foreign Application Priority Data
Oct. 18, 2021 (RU) .............. RU2021130273

(51) Int. Cl.
  *G06V 10/25* (2022.01)
  *G05D 1/00* (2006.01)
  (Continued)

(52) U.S. Cl.
  CPC ......... *G05D 1/0251* (2013.01); *G05D 1/0276* (2013.01); *G08G 1/095* (2013.01)

(58) Field of Classification Search
  CPC ........ G05D 1/02; G05D 1/024; G05D 1/0251; G05D 1/0274; G05D 1/0276; G08G 1/095; G06V 10/25; G06V 20/56; G06V 20/584
  See application file for complete search history.

(56) References Cited

U.S. PATENT DOCUMENTS

| 8,712,624 B1 | 4/2014 | Ferguson et al. |
| 10,627,812 B2 | 4/2020 | Eggert et al. |

(Continued)

FOREIGN PATENT DOCUMENTS

| EP | 3362865 B1 | 7/2021 |
| RU | 2701592 C1 | 9/2019 |

(Continued)

OTHER PUBLICATIONS

Extended European Search Report dated Apr. 3, 2023 issued in respect of the counterpart European Patent Application No. 22202133.9.

(Continued)

*Primary Examiner* — Jess Whittington
*Assistant Examiner* — Rami Nabih Bedewi
(74) *Attorney, Agent, or Firm* — BCF LLP

(57) ABSTRACT

A mobile robot and a method for controlling a mobile robot are provided. The method includes: accessing a 3D map representation of an environment including a respective indication of a crosswalk, a waiting area, and a visual traffic indicator; detecting an object located in the waiting area for generating a bounding box of the object; mapping a position of the bounding box to the 3D map representation; determining a visual occlusion zone of the object in the waiting area; determining a reduced waiting area as a difference between the waiting area and the visual occlusion area, and triggering control of the propulsion system for moving the mobile robot to the reduced waiting area.

20 Claims, 7 Drawing Sheets

(51) Int. Cl.
*G06V 20/56* (2022.01)
*G06V 20/58* (2022.01)
*G08G 1/095* (2006.01)

(56) References Cited

U.S. PATENT DOCUMENTS

| | | | |
|---|---|---|---|
| 10,642,275 | B2 | 5/2020 | Silva et al. |
| 2018/0239021 | A1 | 8/2018 | Akselrod et al. |
| 2019/0250626 | A1* | 8/2019 | Ghafarianzadeh ... G08G 1/0145 |
| 2020/0278681 | A1* | 9/2020 | Gier ..................... G06V 20/56 |
| 2020/0285250 | A1 | 9/2020 | Castorena Martinez et al. |
| 2021/0209367 | A1* | 7/2021 | Korjus .................. G06V 20/56 |
| 2021/0297699 | A1 | 9/2021 | Iguchi et al. |
| 2021/0302990 | A1 | 9/2021 | Heinla et al. |
| 2021/0380119 | A1 | 12/2021 | Korjus et al. |
| 2022/0196410 | A1* | 6/2022 | Hines .................... G06V 20/64 |
| 2022/0204032 | A1* | 6/2022 | Margines .......... B60W 60/0015 |
| 2022/0402492 | A1* | 12/2022 | Sakakura ............ G06V 20/584 |

FOREIGN PATENT DOCUMENTS

| | | |
|---|---|---|
| RU | 2705049 C1 | 11/2019 |
| RU | 2731082 C1 | 8/2020 |
| WO | 2020234041 A1 | 11/2020 |

OTHER PUBLICATIONS

Russian Search Report dated May 25, 2023 issued in respect of the counterpart Russian Patent Application No. RU 2021130273.
U.S. Appl. No. 17/585,272, filed Jan. 26, 2022.

* cited by examiner

MOBILE ROBOT AND A METHOD FOR CONTROLLING THE MOBILE ROBOT

CROSS-REFERENCE

The present application claims priority to Russian Patent Application No. 2021130273, entitled "Mobile Robot and a Method for Controlling the Mobile Robot," filed on Oct. 18, 2021, the entirety of which is incorporated by reference herein.

FIELD OF TECHNOLOGY

The present technology relates to computer-implemented methods and systems for operating a robotic vehicle, and more specifically, to methods and systems for controlling a mobile robot.

BACKGROUND

Autonomous robotic vehicles are vehicles that are able to autonomously navigate through private and/or public spaces. Using a system of sensors that detect the location and/or surroundings of the vehicle, logic within or associated with the vehicle controls the velocity and direction of the robotic vehicle based on the sensor-detected location and surroundings of the vehicle.

A variety of sensor systems may be used by the robotic vehicle, such as but not limited to camera systems, radar systems, and LIDAR systems. Different sensor systems may be employed for capturing different information, and/or in different format, about the location and the surroundings of the vehicle. For example, LIDAR systems may be used to capture point cloud data for building 3D map representations of the surroundings and other potential objects located in proximity to the robotic vehicle.

Such autonomous robotic vehicles are being used for a wide variety of applications, including delivering packages and other items. These applications may require the robotic vehicle to navigate through dynamic environments, such as on crowded sidewalks, in crosswalks where there may be human and vehicular traffic, and so on. In performing this navigation task, an autonomous robotic vehicle needs to avoid collisions with dynamic objects, such as people and moving vehicles, and with static objects, such as parked vehicles, buildings, lamp posts, and other common non-moving objects that may be found within the urban and suburban environments in which the robotic vehicle is expected to operate.

Robotic vehicles are often comparatively small in size and different objects that it encounters during operation can occlude its sensors from "seeing" portions of the surroundings. This may be detrimental since important information for navigation purposes may be found in the occluded portions, thereby hindering safe operation of the robotic vehicle.

U.S. Pat. No. 8,712,624 discloses methods and an apparatus for controlling autonomous vehicles utilizing maps that include visibility information.

SUMMARY

During delivery of goods to a customer, for example, a mobile robot can follow a route to the customer's location. The mobile robot may need to cross a crosswalk as part of its route. Upon approaching the crosswalk, the mobile robot must determine whether crossing is permitted by the traffic light (for example, green light) or is prohibited (for example, red light).

One or more objects such as pedestrians, for example, may be waiting to cross the crosswalk as well and may thus occlude the field of view of a camera sensor of the mobile robot, making the monitoring of the state of the traffic light difficult. In other words, developers of the present technology have realized that such objects may prevent the mobile robot from tracking the state of the traffic light by occluding the traffic light from the field of view of one or more camera sensors of the mobile robot when the mobile robot is in proximity to the crosswalk. The inability of the mobile robot to track the state of the traffic light is undesirable for operation of the mobile robot.

For that purpose, developers of the present technology have devised methods and mobiles robots that are configured to determine one or more target positions in a given area in proximity of the crosswalk to which the mobile robot may move and from which positions the mobile robot is able to track the state of the traffic light without being occluded by one or more objects located in that area.

In some embodiments of the present technology, the mobile robot can detect presence of an object in a given area in proximity to the crosswalk and generate a "bounding box" for that object. The position of this bounding box can be mapped to a 3D map representation of the environment. The mobile robot is configured to determine a "visual occlusion zone" caused by the object in that given area. In one embodiment, this visual occlusion zone may be a "shadow projection" of the bounding box and if the traffic light in the 3D map representation is considered to be a source of light. The mobile robot can select a target position in that given area which is outside the visual occlusion zone for moving into that given area while being able to track the state of the traffic light.

In other embodiments of the present technology, the mobile robot may also determine whether the visual occlusion zone generated based on the bounding box is too large and/or the remainder of the given area is too small. In such cases, the mobile robot may perform a "refined" analysis of the visual occlusion zone caused by the object. During this refined analysis, the mobile robot may generate a "shell structure" representing the object from LIDAR data, for example, and use it instead of the bounding box when generating the visual occlusion zone. The shell structure is a more accurate representation of the shape of the object than the bounding box and is smaller than the bounding box. As such, its shadow projection is likely to be smaller in surface area than the shadow projection of the bounding box, freeing additional surface area for the mobile robot to potentially move in.

In a first broad aspect of the present technology, there is provided a mobile robot having a Light Detection and Ranging (LIDAR) sensor, a camera sensor having a field of view, a propulsion system for propelling the mobile robot in an environment, and a processor being communicatively coupled with the LIDAR sensor, the camera sensor, and the propulsion system. The processor is configured to access a 3D map representation of the environment including a respective indication of a crosswalk, a waiting area for the crosswalk, and a visual traffic indicator for the crosswalk. The 3D map representation is indicative of a position of the visual traffic indicator and its orientation relative to the waiting area. The processor is configured to detect an object located in the waiting area by using at least one of camera data from the camera sensor and LIDAR data from the LIDAR sensor for generating a bounding box of the object. The processor is configured to map a position of the bounding box to the 3D map representation. The processor is configured to determine a visual occlusion zone of the object in the waiting area using the position of the bounding box and the orientation of the visual traffic indicator relative to the waiting area. The visual occlusion zone is an estimated portion of the waiting area in which the visual traffic indicator is occluded from the field of view of the camera sensor by the object if the mobile robot is located in the estimated portion. The processor is configured to determine a reduced waiting area as a difference between the waiting area and the visual occlusion area. The visual traffic indicator is visible in the field of view of the camera sensor if the mobile robot is located in the reduced waiting area. The processor is configured to trigger control of the propulsion system for moving the mobile robot to the reduced waiting area.

In some embodiments of the mobile robot, the processing is further configured to compare the reduced waiting area to a pre-determined threshold area and in response to the reduced waiting area being above the pre-determined threshold area, control the propulsion system for moving the mobile robot to the reduced waiting area. In response to the reduced waiting area being below the pre-determined threshold area, the processor is further configured to determine a shell of the object using the LIDAR data of the LIDAR sensor, where the shell is a more accurate estimation of a shape of the object than the bounding box. In response to the reduced waiting area being below the pre-determined threshold area, the processor is further configured to map a position of the shell on the 3D representation, determine an other visual occlusion zone of the object in the waiting area using the position of the shell and the orientation of the visual indicator relative to the waiting area, where the other visual occlusion zone is an other estimated portion of the waiting area in which the visual traffic indicator will be occluded from the field of view of the camera sensor by the object if the mobile robot is located in the other estimated portion, and where the other estimated portion is smaller than the estimated portion. In response to the reduced waiting area being below the pre-determined threshold area, the processor is further configured to determine an other reduced waiting area as a difference between the waiting area and the other visual occlusion area, where the visual traffic indicator is visible in the field of view of the camera sensor is the mobile robot is located in the other reduced waiting area. In response to the reduced waiting area being below the pre-determined threshold area, the processor is further configured to compare the other reduced waiting area to the pre-determined threshold area. In response to the other reduced waiting area being above the pre-determined threshold area, the processor is configured to trigger control the propulsion system for moving the mobile robot to the other reduced waiting area.

In some embodiments of the mobile robot, the processor is further configured to locally store at least a portion of the 3D map representation.

In some embodiments of the mobile robot, to detect, the processor is further configured to employ an Object Detection Neural Network (ODNN) onto the at least one of the camera data and the LIDAR data.

In some embodiments of the mobile robot, to determine the visual occlusion zone the processor is further configured to project at least one corner of the bounding box onto the waiting area by casting a ray in the 3D map representation from the visual traffic indicator onto the waiting area and such that the ray is passes through the at least one of the corners of the bounding box.

In some embodiments of the mobile robot, the ray is more than one ray, and the processor is configured to cast the more than one rays from the visual traffic indicator towards the bounding box to define a shadow projection of the bounding box in the waiting area, and where the shadow projection of the bounding box represents the visual occlusion zone.

In some embodiments of the mobile robot, the camera sensor is located at a pre-determined distance above a terrain on which the mobile robot moves, and where the processor is further configured to use the pre-determined distance to determine the visual occlusion zone, and where the visual occlusion zone is located at the pre-determined distance above the waiting area.

In some embodiments of the mobile robot, the processor is further configured to control the propulsion system for stopping the mobile robot in the reduced waiting area.

In some embodiments of the mobile robot, the processor is further configured to monitor a state of the visual traffic indicator.

In some embodiments of the mobile robot, the visual traffic indicator is a traffic light.

In some embodiments of the mobile robot, the processor is an onboard processor of the mobile robot.

In some embodiments of the mobile robot, the processor is a remote processor of a server, the server being communicatively coupled with the mobile robot.

In a second broad aspect of the present technology, there is provided a method for controlling a mobile robot in an environment. The method comprises accessing a 3D map representation of the environment including a respective indication of a crosswalk, a waiting area for the crosswalk, and a visual traffic indicator for the crosswalk, where the 3D map representation is indicative of a position of the visual traffic indicator and its orientation relative to the waiting area. The method comprises detecting, using at least one sensor of the mobile robot, an object in the waiting area for generating a bounding box of the object. The method comprises casting, in the 3D map representation, two rays from the visual traffic indicator towards the bounding box to define a shadow projection of the bounding box in the waiting area, the shadow projection representing a visual occlusion zone of the object in the waiting area. The visual occlusion zone is an estimated portion of the waiting area in which the visual traffic indicator is occluded from the field of view of the camera sensor by the object if the mobile robot is located in the estimated portion. The method comprises determining a reduced waiting area by subtracting the visual occlusion zone from the waiting area. The method comprises in response to the reduced waiting area being above a pre-determined threshold area, controlling the mobile robot so that the robot stops inside the reduced waiting area, the visual traffic indicator being visible in the field of view of the camera sensor when the mobile robot is located in the reduced waiting area.

In some embodiments of the method, in response to the reduced waiting area being lower than the pre-determined threshold area, the method comprises generating, using the at least one sensor, a shell for object, where the shell is a more accurate estimation of a shape of the object than the bounding box. The method comprises casting, in the 3D map representation, two rays from the visual traffic indicator towards the shell to define an other shadow projection of the shell in the waiting area, the other shadow projection representing an other visual occlusion zone of the object in the waiting area, where the other visual occlusion zone is smaller than the visual occlusion zone. The method comprises determining an other reduced waiting area by subtracting the other visual occlusion zone from the waiting area. In response to the other reduced waiting area being above the pre-determined threshold area, the method comprises controlling the mobile robot so that the robot stops inside the other reduced waiting area.

In some embodiments of the method, the method further comprises continuously tracking a state of the visual traffic indicator using at least one camera sensor of the mobile robot.

In a third broad aspect of the present technology, there is provided a method of controlling a mobile robot having a Light Detection and Ranging (LIDAR) sensor, a camera sensor having a field of view, a propulsion system for propelling the mobile robot in an environment, and a processor being communicatively coupled with the LIDAR sensor, the camera sensor, and the propulsion system. The method is executable by the processor. The method comprises accessing a 3D map representation of the environment including a respective indication of a crosswalk, a waiting area for the crosswalk, and a visual traffic indicator for the crosswalk. The 3D map representation indicative of a position of the visual traffic indicator and its orientation relative to the waiting area. The method comprises detecting an object located in the waiting area by using at least one of camera data from the camera sensor and LIDAR data from the LIDAR sensor for generating a bounding box of the object. The method comprises mapping a position of the bounding box to the 3D map representation. The method comprises determining a visual occlusion zone of the object in the waiting area using the position of the bounding box and the orientation of the visual traffic indicator relative to the waiting area. The visual occlusion zone is an estimated portion of the waiting area in which the visual traffic indicator is occluded from the field of view of the camera sensor by the object if the mobile robot is located in the estimated portion. The method comprises determining a reduced waiting area as a difference between the waiting area and the visual occlusion area, where the visual traffic indicator is visible in the field of view of the camera sensor if the mobile robot is located in the reduced waiting area. The method comprises triggering control of the propulsion system for moving the mobile robot to the reduced waiting area.

In some embodiments of the method, the method further comprises comparing the reduced waiting area to a pre-determined threshold area, and in response to the reduced waiting area being above the pre-determined threshold area, controlling the propulsion system for moving the mobile robot to the reduced waiting area. The method further comprises, in response to the reduced waiting area being below the pre-determined threshold area, determining a shell of the object using the LIDAR data of the LIDAR sensor, where the shell is a more accurate estimation of a shape of the object than the bounding box. The method further comprises, in response to the reduced waiting area being below the pre-determined threshold area mapping a position of the shell on the 3D representation. The method further comprises, in response to the reduced waiting area being below the pre-determined threshold area, determining an other visual occlusion zone of the object in the waiting area using the position of the shell and the orientation of the visual indicator relative to the waiting area. The other visual occlusion zone is an other estimated portion of the waiting area in which the visual traffic indicator will be occluded from the field of view of the camera sensor by the object if the mobile robot is located in the other estimated portion. The other estimated portion is smaller than the estimated portion. The method further comprises, in response to the reduced waiting area being below the pre-determined threshold area, determining an other reduced waiting area as a difference between the waiting area and the other visual occlusion area. The visual traffic indicator is visible in the field of view of the camera sensor is the mobile robot is located in the other reduced waiting area. The method further comprises, in response to the reduced waiting area being below the pre-determined threshold area, comparing the other reduced waiting area to the pre-determined threshold area. In response to the other reduced waiting area being above the pre-determined threshold area, the method comprises triggering control the propulsion system for moving the mobile robot to the other reduced waiting area.

In some embodiments of the method, at least a portion of the 3D map representation is locally stored.

In some embodiments of the method, the detecting includes employing an Object Detection Neural Network (ODNN) onto the at least one of the camera data and the LIDAR data.

In some embodiments of the method, the determining the visual occlusion zone includes projecting at least one corner of the bounding box onto the waiting area by casting a ray in the 3D map representation from the visual traffic indicator onto the waiting area and such that the ray is passes through the at least one of the corners of the bounding box.

In some embodiments of the method, the ray is more than one ray, the casting the more than one rays from the visual traffic indicator towards the bounding box is for defining a shadow projection of the bounding box in the waiting area, where the shadow projection of the bounding box represents the visual occlusion zone.

In some embodiments of the method, the camera sensor is located at a pre-determined distance above a terrain on which the mobile robot moves, and where the determining the visual occlusion zone includes using the pre-determined distance, and where the visual occlusion zone is located at the pre-determined distance above the waiting area.

In some embodiments of the method, the method further comprises controlling the propulsion system for stopping the mobile robot in the reduced waiting area.

In some embodiments of the method, the method further comprises monitoring a state of the visual traffic indicator.

In some embodiments of the method, the visual traffic indicator is a traffic light.

In some embodiments of the method, the processor is an onboard processor of the mobile robot.

In some embodiments of the method, the processor is a remote processor of a server, the server being communicatively coupled with the mobile robot.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
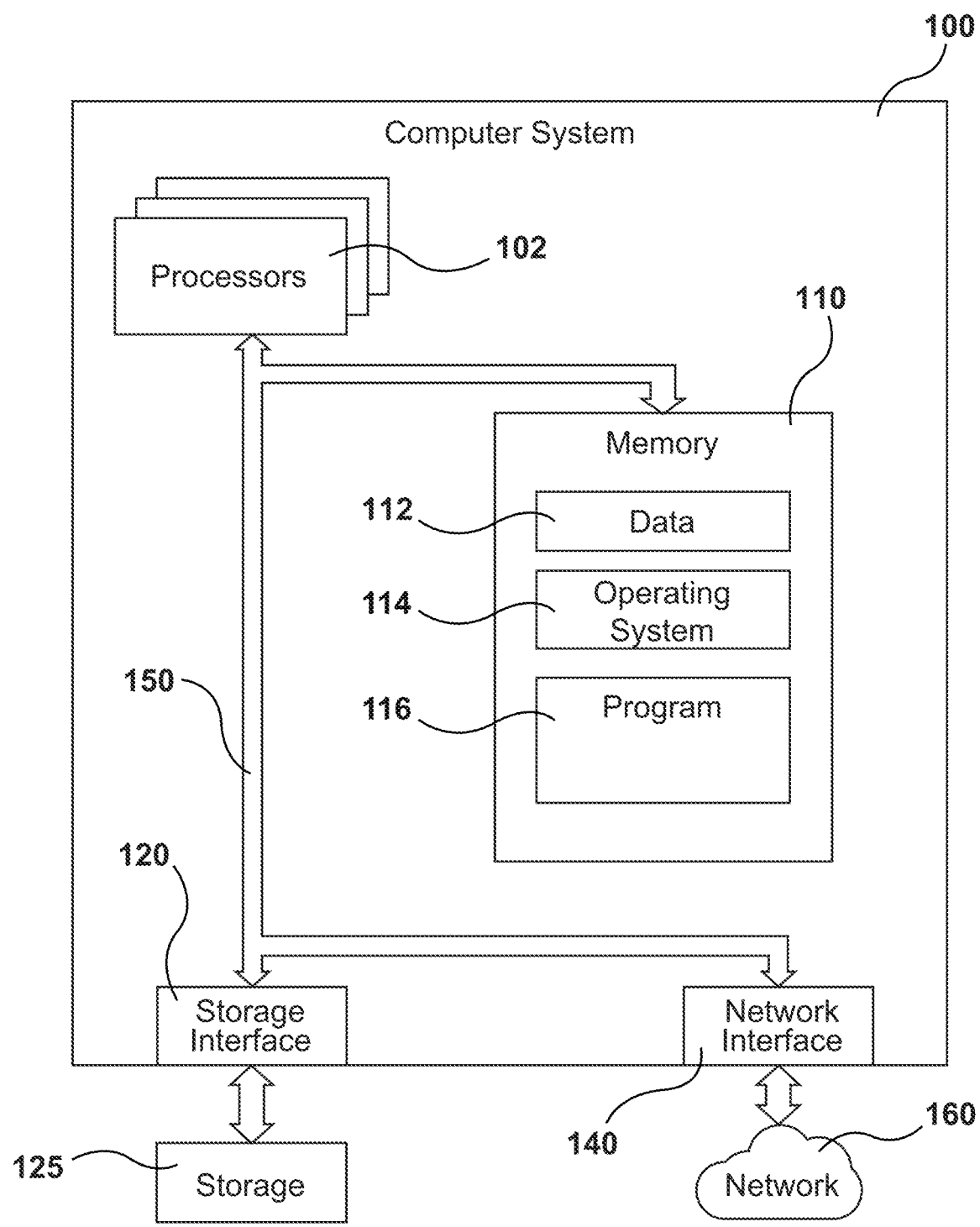
FIG. 1 depicts a schematic diagram of an example computer system for use in some implementations of systems and/or methods of the present technology.

Various representative implementations of the disclosed technology will be described more fully hereinafter with reference to the accompanying drawings. The present technology may, however, be implemented in many different forms and should not be construed as limited to the representative implementations set forth herein. In the drawings, the sizes and relative sizes of layers and regions may be exaggerated for clarity. Like numerals refer to like elements throughout.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

It will be understood that, although the terms first, second, third, etc. may be used herein to describe various elements, these elements should not be limited by these terms. These terms are used to distinguish one element from another. Thus, a first element discussed below could be termed a second element without departing from the teachings of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. By contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is only intended to describe particular representative implementations and is not intended to be limiting of the present technology. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The functions of the various elements shown in the figures, including any functional block labeled as a "processor," may be provided through the use of dedicated hardware as well as hardware capable of executing software. When provided by a processor, the functions may be provided by a single dedicated processor, by a single shared processor, or by a plurality of individual processors, some of which may be shared. In some implementations of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, an application-specific integrated circuit (ASIC), a field-programmable gate array (FPGA), a read-only memory (ROM) for storing software, a random-access memory (RAM), and non-volatile storage. Other hardware, conventional and/or custom, may also be included.

Software modules, or simply modules or units which are implied to be software, may be represented herein as any combination of flowchart elements or other elements indicating the performance of process steps and/or textual description. Such modules may be executed by hardware that is expressly or implicitly shown. Moreover, it should be understood that a module may include, for example, but without limitation, computer program logic, computer program instructions, software, stack, firmware, hardware circuitry, or a combination thereof, which provides the required capabilities.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

The present technology may be implemented as a system, a method, and/or a computer program product. The computer program product may include a computer-readable storage medium (or media) storing computer-readable program instructions that, when executed by a processor, cause the processor to carry out aspects of the disclosed technology. The computer-readable storage medium may be, for example, an electronic storage device, a magnetic storage device, an optical storage device, an electromagnetic storage device, a semiconductor storage device, or any suitable combination of these. A non-exhaustive list of more specific examples of the computer-readable storage medium includes: a portable computer disk, a hard disk, a random-access memory (RAM), a read-only memory (ROM), a flash memory, an optical disk, a memory stick, a floppy disk, a mechanically or visually encoded medium (e.g., a punch card or bar code), and/or any combination of these. A computer-readable storage medium, as used herein, is to be construed as being a non-transitory computer-readable medium. It is not to be construed as being a transitory signal, such as radio waves or other freely propagating electromagnetic waves, electromagnetic waves propagating through a waveguide or other transmission media (e.g., light pulses passing through a fiber-optic cable), or electrical signals transmitted through a wire.

It will be understood that computer-readable program instructions can be downloaded to respective computing or processing devices from a computer-readable storage medium or to an external computer or external storage device via a network, for example, the Internet, a local area network, a wide area network and/or a wireless network. A network interface in a computing/processing device may receive computer-readable program instructions via the network and forward the computer-readable program instructions for storage in a computer-readable storage medium within the respective computing or processing device.

Computer-readable program instructions for carrying out operations of the present disclosure may be assembler instructions, machine instructions, firmware instructions, configuration data for integrated circuitry, or either source code or object code written in any combination of one or more programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network.

All statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable program instructions. These computer-readable program instructions may be provided to a processor or other programmable data processing apparatus to generate a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein includes an article of manufacture including instructions which implement aspects of the function/act specified in the flowcharts, flow diagrams, state transition diagrams, pseudo-code, and the like.

The computer-readable program instructions may also be loaded onto a computer, other programmable data processing apparatus or other devices to cause a series of operational steps to be performed on the computer, other programmable apparatus or other devices to generate a computer-implemented process, such that the instructions which execute on the computer, other programmable apparatus, or other device implement the functions/acts specified in the flowcharts, flow diagrams, state transition diagrams, pseudo-code, and the like.

In some alternative implementations, the functions noted in flowcharts, flow diagrams, state transition diagrams, pseudo-code, and the like may occur out of the order noted in the figures. For example, two blocks shown in succession in a flowchart may, in fact, be executed substantially concurrently, or the blocks may sometimes be executed in the reverse order, depending upon the functionality involved. It will also be noted that each of the functions noted in the figures, and combinations of such functions can be implemented by special-purpose hardware-based systems that perform the specified functions or acts or by combinations of special-purpose hardware and computer instructions.

With these fundamentals in place, we will now consider some non-limiting examples to illustrate various implementations of aspects of the present disclosure.

Computer System

FIG. 1 shows a computer system 100. The computer system 100 may be a multi-user computer, a single user computer, a laptop computer, a tablet computer, a smartphone, an embedded control system, or any other computer system currently known or later developed. Additionally, it will be recognized that some or all the components of the computer system 100 may be virtualized and/or cloud-based. As shown in FIG. 1, the computer system 100 includes one or more processors 102, a memory 110, a storage interface 120, and a network interface 140. These system components are interconnected via a bus 150, which may include one or more internal and/or external buses (not shown) (e.g. a PCI bus, universal serial bus, IEEE 1394 "Firewire" bus, SCSI bus, Serial-ATA bus, etc.), to which the various hardware components are electronically coupled.

The memory 110, which may be a random-access memory or any other type of memory, may contain data 112, an operating system 114, and a program 116. The data 112 may be any data that serves as input to or output from any program in the computer system 100. The operating system 114 is an operating system such as MICROSOFT WINDOWS or LINUX. The program 116 may be any program or set of programs that include programmed instructions that may be executed by the processor to control actions taken by the computer system 100.

The storage interface 120 is used to connect storage devices, such as the storage device 125, to the computer system 100. One type of storage device 125 is a solid-state drive, which may use an integrated circuit assembly to store data persistently. A different kind of storage device 125 is a hard drive, such as an electro-mechanical device that uses magnetic storage to store and retrieve digital data. Similarly, the storage device 125 may be an optical drive, a card reader that receives a removable memory card, such as an SD card, or a flash memory device that may be connected to the computer system 100 through, e.g., a universal serial bus (USB).

In some implementations, the computer system 100 may use well-known virtual memory techniques that allow the programs of the computer system 100 to behave as if they have access to a large, contiguous address space instead of access to multiple, smaller storage spaces, such as the memory 110 and the storage device 125. Therefore, while the data 112, the operating system 114, and the programs 116 are shown to reside in the memory 110, those skilled in the art will recognize that these items are not necessarily wholly contained in the memory 110 at the same time.

The processors 102 may include one or more microprocessors and/or other integrated circuits. The processors 102 execute program instructions stored in the memory 110. When the computer system 100 starts up, the processors 102 may initially execute a boot routine and/or the program instructions that make up the operating system 114.

The network interface 140 is used to connect the computer system 100 to other computer systems or networked devices (not shown) via a network 160. The network interface 140 may include a combination of hardware and software that allows communicating on the network 160. In some implementations, the network interface 140 may be a wireless network interface. The software in the network interface 140 may include software that uses one or more network protocols to communicate over the network 160. For example, the network protocols may include TCP/IP (Transmission Control Protocol/Internet Protocol).

It will be understood that the computer system 100 is merely an example and that the disclosed technology may be used with computer systems or other computing devices having different configurations.

Networked Computing Environment

Figure 2:
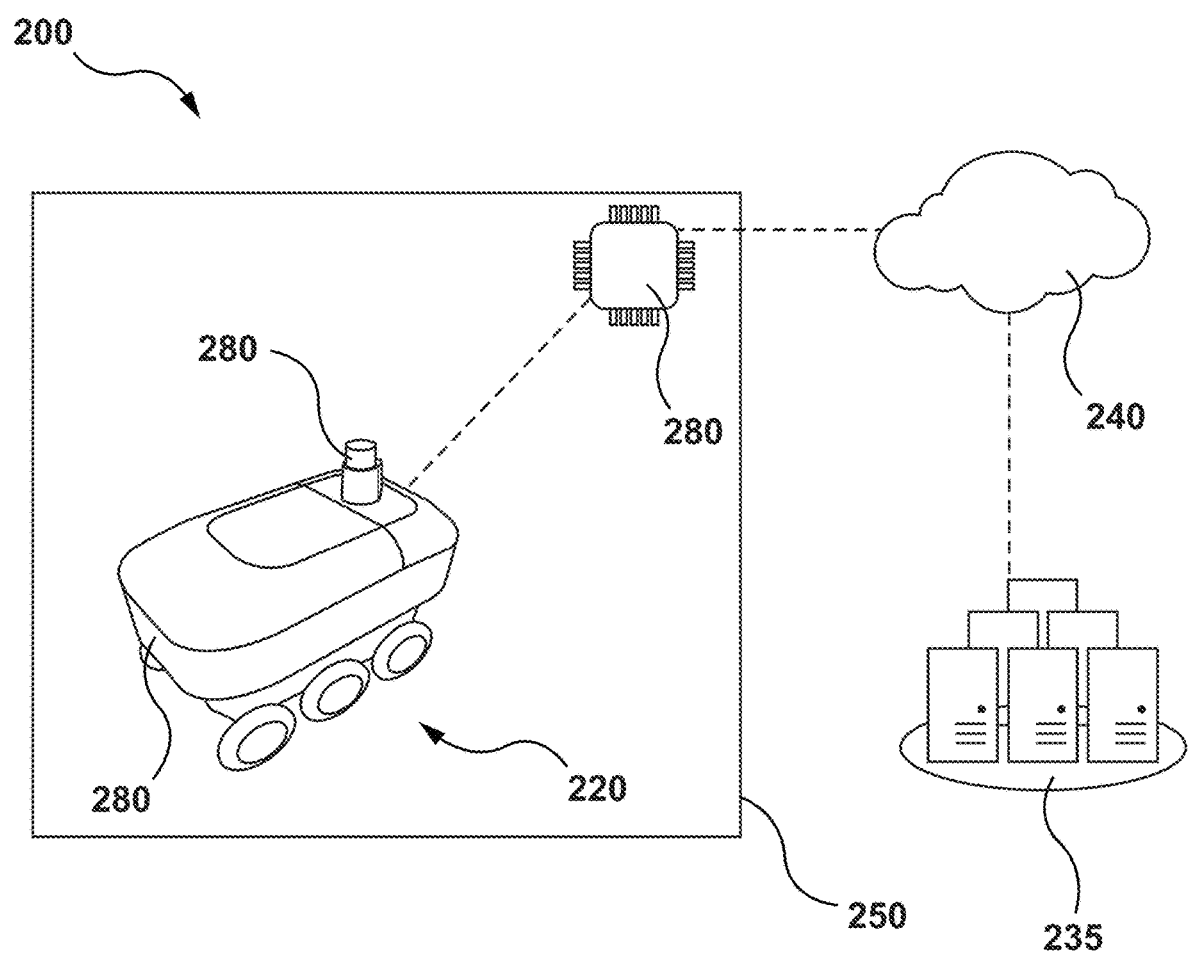
FIG. 2 depicts a networked computing environment including a robotic vehicle, suitable for use with some implementations of the present technology.

FIG. 2 shows a networked computing environment 200 suitable for use with some non-limiting implementations of the present technology. The networked computing environment 200 includes a computing device 210 associated with a robotic vehicle 220. The environment 200 also includes one or more servers 235 in communication with the computing device 210 via a communication network 240 (e.g. the Internet or the like).

In at least some non-limiting implementations of the present technology, the computing device 210 is communicatively coupled to control systems of the robotic vehicle 220. The computing device 210 could be arranged and configured to control different operations systems of the robotic vehicle 220, including but not limited to: motor control, steering systems, and signaling and illumination systems.

In some non-limiting implementations of the present technology, the networked computing environment 200 could include a GPS satellite (not depicted) transmitting and/or receiving a GPS signal to/from the computing device 210. It will be understood that the present technology is not limited to GPS and may employ a positioning technology other than GPS. It should be noted that the GPS satellite can be omitted altogether.

The robotic vehicle 220, to which the computing device 210 is associated, could be any robotic vehicle, for delivery applications, warehouse applications, or the like. Although the robotic vehicle 220 is depicted as being a land vehicle, this may not be the case in each and every non-limiting implementation of the present technology. For example, in certain non-limiting implementations of the present technology, the robotic vehicle 220 may be an aircraft, such as a flying drone, or a watercraft.

The robotic vehicle 220 may be a fully autonomous vehicle, or a partially autonomous vehicle, in which a human operator remotely controls some aspects of the vehicle's operation, while other aspects are automated. As one non-limiting example, the robotic vehicle 220 may operate autonomously unless or until it encounters an unexpected or unusual situation that it is unable to handle autonomously, at which time a remote human operator could be contacted. It should be noted that specific parameters of the robotic vehicle 220 are not limiting, these specific parameters including for example: manufacturer, model, year of manufacture, vehicle weight, vehicle dimensions, vehicle weight distribution, vehicle surface area, vehicle height, motor type, tire type (if tires are used), power system, or other characteristics or parameters of a vehicle.

According to the present technology, the implementation of the computing device 210 is not particularly limited. For example, the computing device 210 could be implemented as a vehicle motor control unit, a vehicle CPU, a computer system built into the robotic vehicle 220, a plug-in control module, and the like. Thus, it should be noted that the computing device 210 may or may not be permanently associated with the robotic vehicle 220.

The computing device 210 could include some or all of the components of the computer system 100 depicted in FIG. 1, depending on the particular implementation. In certain implementations, the computing device 210 is an on-board computer device and includes the processors 102, the storage device 125 and the memory 110. In other words, the computing device 210 includes hardware and/or software and/or firmware, or a combination thereof, for processing data as will be described in greater detail below.

In some non-limiting implementations of the present technology, the communication network 240 is the Internet. In alternative non-limiting implementations of the present technology, the communication network 240 can be implemented as any suitable local area network (LAN), wide area network (WAN), a private communication network or the like. It should be expressly understood that implementations for the communication network 240 are for illustration purposes only. A communication link (not separately numbered) is provided between the computing device 210 and the communication network 240, the implementation of which will depend, inter alia, on how the computing device 210 is implemented. Merely as an example and not as a limitation, the communication link can be implemented as a wireless communication link. Examples of wireless communication links may include, but are not limited to, a 3G communication network link, a 4G communication network link, and the like. The communication network 240 may also use a wireless connection with the servers 235.

In some implementations of the present technology, the servers 235 are implemented as computer servers and could include some or all of the components of the computer system 100 of FIG. 1. In one non-limiting example, the servers 235 are implemented as a Dell™ PowerEdge™ Servers running the Microsoft™ Windows Server™ operating system, but can also be implemented in any other suitable hardware, software, and/or firmware, or a combination thereof.

In some non-limiting implementations of the present technology, the processors 102 of the computing device 210 could be in communication with the servers 235 to receive one or more updates. Such updates could include, but are not limited to, software updates, map updates, route updates, geofencing updates, weather updates, and the like. In some non-limiting implementations of the present technology, the computing device 210 can also be configured to transmit to the servers 235 certain operational data, such as routes traveled, traffic data, performance data, and the like. Some or all such data transmitted between the robotic vehicle 220 and the servers 235 may be encrypted and/or anonymized.

It should be noted that a variety of sensors and systems may be used by the computing device 210 for gathering information about surroundings 250 of the robotic vehicle 220. As seen in FIG. 2, the robotic vehicle 220 may be equipped with a plurality of sensor systems 280. It should be noted that different sensor systems from the plurality of sensor systems 280 may be used for gathering different types of data regarding the surroundings 250 of the robotic vehicle 220.

In one example, the plurality of sensor systems 280 may include various optical systems including, inter alia, one or more camera-type sensor systems that are mounted to the robotic vehicle 220 and communicatively coupled to the processors 102 of the computing device 210. Broadly speaking, the one or more camera-type sensor systems may be configured to gather image data about various portions of the surroundings 250 of the robotic vehicle 220. In some cases, the image data provided by the one or more camera-type sensor systems could be used by the computing device 210 for performing object detection procedures. For example, the computing device 210 could be configured to feed the image data provided by the one or more camera-type sensor systems to an Object Detection Neural Network (ODNN) that has been trained to localize and classify potential objects in the surroundings 250 of the robotic vehicle 220.

In at least some embodiments, the ODNN may be trained in a manner known from aspects disclosed in a co-owned U.S. patent application Ser. No. 17/585,272, entitled "METHODS AND ELECTRONIC DEVICES FOR DETECTING OBJECTS IN SURROUNDINGS OF A SELF-DRIVING CAR", filed on Jan. 26, 2022, the contents of which is incorporated herein by reference in its entirety.

In another example, the plurality of sensor systems 280 could include one or more radar-type sensor systems that are mounted to the robotic vehicle 220 and communicatively coupled to the processors 102. Broadly speaking, the one or more radar-type sensor systems may be configured to make use of radio waves to gather data about various portions of the surroundings 250 of the robotic vehicle 220. For example, the one or more radar-type sensor systems may be configured to gather radar data about potential objects in the surroundings 250 of the robotic vehicle 220, such data potentially being representative of a distance of objects from the radar-type sensor system, orientation of objects, velocity and/or speed of objects, and the like.

In a further example, the plurality of sensor systems 280 could include one or more LIDAR systems that are mounted to the robotic vehicle 220 and communicatively coupled to the processors 102. Broadly speaking, a LIDAR system is configured to capture data about the surroundings 250 of the robotic vehicle 220 used, for example, for building a multi-dimensional map of objects in the surroundings 250 of the robotic vehicle 220. The LIDAR system could be mounted to the robotic vehicle 220 in a variety of locations and/or in a variety of configurations for gathering information about surroundings 250 of the robotic vehicle 220.

In the context of the present technology, the computing device 210 is configured to detect one or more objects in the surroundings 250 of the robotic vehicle 220 based on data acquired from one or more camera systems and from one or more LIDAR systems. For example, the computing device 210 configured to detect a given object in the surroundings 250 of the robotic vehicle 220 may be configured to identify LIDAR data and camera data associated with the given object, generate an "embedding" representative of features associated with the given object, and detect the object by generating a bounding box for the object.

Robotic Vehicle Operation

Implementations of the disclosed technology provide navigation or motion planning for operating a robotic vehicle in an environment that includes both static and dynamic (i.e., moving) objects. As described herein, the robotic vehicle is described in the context of a small land-based robotic vehicle intended to deliver goods, packages, boxes, or other parcels in an urban or suburban setting. Because of the tasks that it performs, such a robotic vehicle normally travels along sidewalks and footways. Thus, the motion planning module in the vehicle should consider the behavior of pedestrians moving along or crossing its path.

Additionally, the robotic vehicle may cross roads. Cars and other vehicles moving on roads in urban and suburban settings may not notice small-sized robotic vehicles, which may lead to collisions that could damage or destroy the robotic vehicle and its cargo. Consequently, the motion planning module for such a robotic vehicle should consider objects in a roadway, including, e.g., moving and parked cars and other vehicles.

For a delivery vehicle, one example of a task may be to deliver a parcel from a starting point to a destination by a particular time. Thus, the motion planning module should consider the speed of the robotic vehicle and determine if adequate progress is being made toward the destination. These considerations are particularly relevant when the delivery tasks are time-critical or when the destination is remote.

For purposes of illustration, the example robotic vehicle uses LIDAR and other sensors located on various sides of the vehicle. A computing device associated with the robotic vehicle receives the data from the sensors and generates a 3D map of points (point cloud). This 3D map of points may be used by the robotic vehicle to, e.g., obtain a distance from surrounding objects and to determine a trajectory and speed.

It is contemplated that the robotic vehicle may also make use of a 3D map representation that is provided thereto by the servers 235. For example, the 3D map representation of an environment in which the robotic vehicle is to operate may be "built" on the servers 235 and may be accessible remotely by the robotic vehicle. Additionally or alternatively, the 3D map representation of the environment may also be transmitted, at least in part, to the robotic vehicle for local storage and local access purposes.

It should be noted that the servers 235 may collect information from one or more robotic vehicles (e.g., a fleet) that are tasked with mapping the environment, thereby generating respective 3D map representations a given region. For example, one or more robotic vehicles may generate a 3D map representation of as a street, a city block, a municipality, a city, and a like. This information may be collected by the servers 235 for unifying information from the one or more robotic vehicles into a 3D map representation to be used during operation of the robotic vehicle.

During operation, the robotic vehicle may be configured to access a 3D map representation of its environment in order to navigate in the environment. Broadly speaking, a 3D map representation has a system of coordinates for locating various objects found in the environment such as poles, mailboxes, curbs, roads, buildings, fire hydrants, traffic cones, traffic lights, crosswalks, trees, fences, billboards, landmarks, and the like.

More particularly, the 3D map representation contains information indicative of a position of a given object in the system of coordinates of the 3D map, and may also contain information indicative of an orientation of the given object in the system of coordinates the 3D map. It can also be said that the 3D map representation may contain information indicative of a relative position and relative orientation of a first one from a pair of objects with respect to a second one from the pair of objects.

It should be noted that one or more objects in the 3D map representation may include native objects to the environment as well as "artificial" objects. Broadly speaking, native objects refer to actual, physical, objects that can be found in the environment, while artificial objects refer to objects that can be added to the 3D map representation for navigation purposes of the robotic vehicle. For example, artificial objects may include navigation paths, accessible areas, non-accessible areas, waiting areas, and the like.

It is contemplated that artificial objects may be mapped onto the 3D map representation by applying a "layer" onto the 3D map representation. For example, the servers 235 may use a system of coordinates associated with this "layer" containing artificial objects and the system of coordinates associated with the 3D map representation for mapping the artificial objects from the layer onto the 3D map representation. How some of the artificial objects may be employed by the robotic vehicle for navigation purposes will be disclosed in greater details below.

Figure 3:
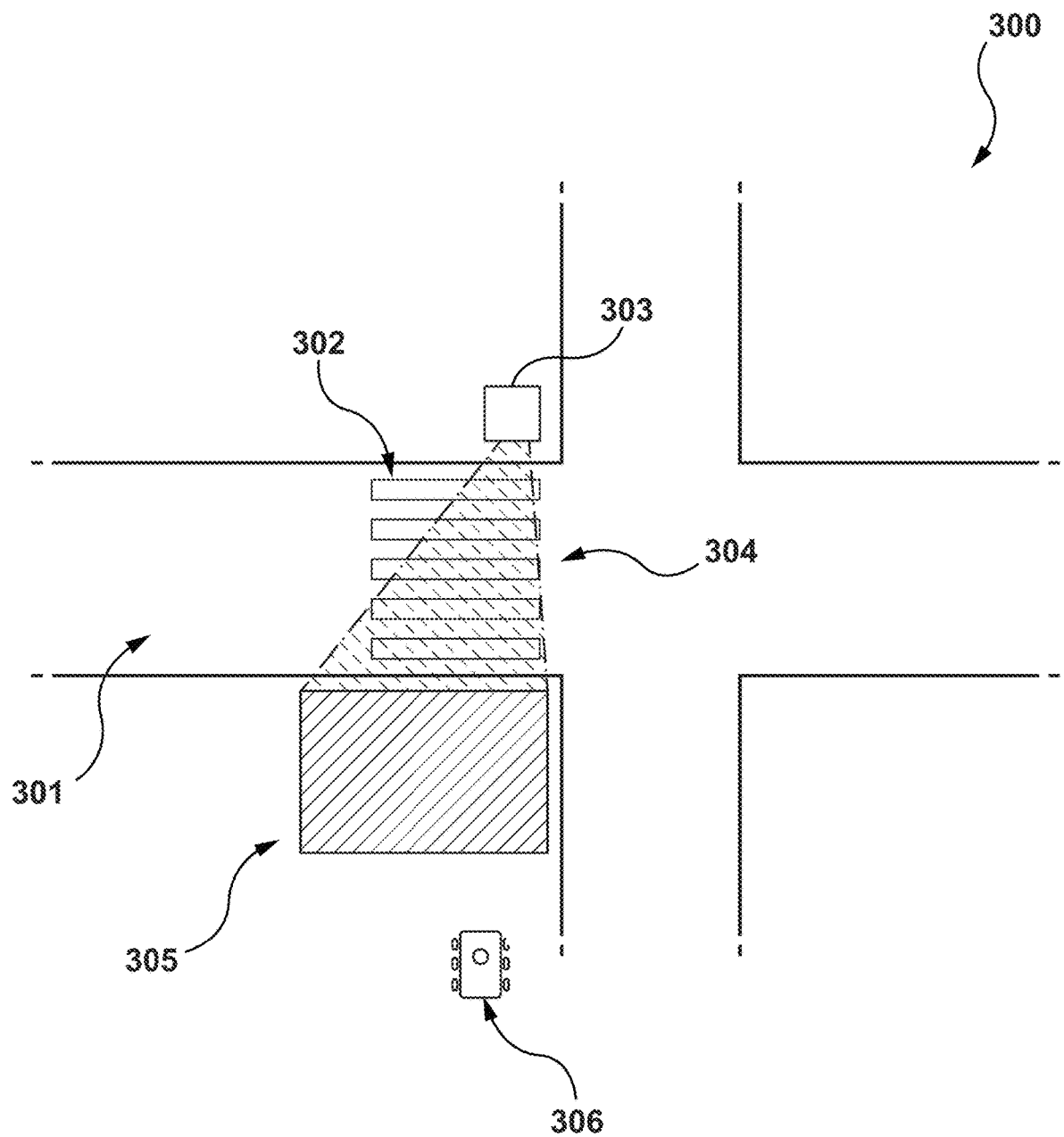
FIG. 3 depicts a bird's eye view of a 3D map representation accessed by the computer system of FIG. 1 in accordance with various implementations of the disclosed technology.

FIG. 3 shows a schematic illustration of a scenario in which various implementations of the disclosed technology may be used. There is depicted a bird's eye view 300 of a 3D map representation accessed by a mobile robot 306.

The 3D map representation contains native objects such as a road 301, a crosswalk 302, and a visual traffic indicator 303. The 3D map representation also contains artificial objects such as a waiting area 305. It is contemplated that the 3D map representation contains information indicative of the position of the visual traffic indicator 303 and its orientation relative to the waiting area 305. For example, the position and orientation of the visual traffic indicator relative to the waiting area 305 may allow defining a light projection 304 indicative of how a visual signal from the visual traffic indicator 303 is cast onto the waiting area 305 in 3D space.

Let it be assumed that the mobile robot 306 is currently navigating through the environment for delivering goods to a customer. As part of the route that the mobile robot 306 is to take for delivering the goods, the mobile robot 306 needs to cross the crosswalk 302. Upon approaching the crosswalk 302, the mobile robot 306 is configured to analyze the visual signal provided by the visual traffic indicator 303 for determining whether it is permitted (e.g., green light) to traverse the crosswalk 303 or is prohibited (e.g., red light) to do so.

The mobile robot 306 may be configured to move into the waiting area 305 under different circumstances. In one example, the mobile robot 306 may move into the waiting area 305 for crossing the crosswalk 302 if the visual signal from the visual traffic indicator 303 permits the crossing. In an other example, the mobile robot 306 may move into the waiting area 305 for waiting to cross the crosswalk 302 if the visual traffic indicator 303 currently prohibits the crossing.

In some embodiments of the present technology, the mobile robot 306 may be configured to continuously track the visual signal or "state" of the visual traffic indicator 303 during operation in order to determine whether the crossing of the crosswalk 302 is currently permitted or prohibited.

It should be noted that when the visual traffic indicator 303 is currently prohibiting the crossing, the mobile robot 306 as well as other dynamic objects may be waiting in the waiting area 305 until the visual traffic indicator 303 permits the crossing. Such dynamic objects may include pedestrians that are awaiting to cross the crosswalk 302. Developers of the present technology have realized that such dynamic objects may prevent the mobile robot 306 from being able to continuously track the state of the visual traffic indicator 303 by occluding the visual traffic indicator 303 from the field of view of one or more camera sensors of the mobile robot 306 when the mobile robot 306 is in the waiting area 305. The inability of the mobile robot 306 to track the state of the visual indicator 303 may be undesirable for operation of the mobile robot 306 in the environment.

For that purpose, developers of the present technology have devised methods and mobiles robots that are configured to determine one or more target positions in the waiting area 305 to which the mobile robot 306 may move so as to being able to continuously track the state of the visual traffic indicator 303 without being occluded by one or more dynamic objects located in the waiting area.

In at least some embodiments of the present technology, it is contemplated that the determination of one or more target positions in the waiting area 305 may also be performed for static object in addition to, or instead of, dynamic objects. Static objects such as mailboxes, poles, and/or billboards, for example, may also occlude the visual traffic indicator from the field of view of the one or more camera sensors of the mobile robot 306 when the mobile robot is in the waiting area 305.

To that end, the mobile robot 306 may be configured to determine whether object(s) are located in the waiting area 305. For example, the mobile robot 306 may be configured to detect a given object in the surroundings of the mobile robot 306.

It should be noted that the mobile robot 306 may use at least one of camera data from the camera sensor and LIDAR data from the LIDAR sensor for generating a bounding box of the object. In one example, the camera data and/or the LIDAR data may be inputted into the ODNN that is configured to generate a bounding box for the object.

It should be noted that in some embodiments of the present technology, the ODNN may detect presence of a given object, and generate a bounding box for that given object indicative of its position in the environment. In further embodiments, the ODNN may also be configured to classify the given object as being of a particular type of object (e.g., pedestrian, bike, stroller).

In one example, the mobile robot 306 may use LIDAR data for detecting the object, thereby generating a bounding box for that object. In this example, the bounding box may be generated by the mobile robot 306 in a system of coordinates of the LIDAR sensor.

A position of the bounding box may be outputted by the ODNN in a variety of manners. In one implementation, the position of the bounding box may be outputted as a combination of a central point, a height offset from the central point, a length offset from the central point, and a width offset from the central point in the system of coordinates of the LIDAR sensor (and/or of the LIDAR point cloud). In an other implementation, the position of the bounding box may be outputted as a combination of coordinates of the respective corners of the bounding box (e.g., eight in total) in the system of coordinates of the LIDAR sensor (and/or of the LIDAR point cloud).

Irrespective of a specific format in which the position of the bounding box is provided in the system of coordinates of the LIDAR sensor (and/or of the LIDAR point cloud), the mobile robot 306 is configured to map the position of the bounding box into the 3D map representation discussed above. In other words, the mobile robot 306 is configured to map the position of the bounding box from the system of coordinates of the LIDAR sensor (and/or of the LIDAR point cloud) to its position in the system of coordinates of the 3D map representation.

To that end, the mobile robot 306 may be configured to implement a variety of mapping algorithms. In at least one embodiment, the mobile robot 306 may be configured to apply a transformation matrix onto the position of the bounding box in the system of coordinates of the LIDAR sensor for determining the location of the bounding box in the system of coordinates of the 3D map representation.

In at least some embodiments of the present technology, the mapping algorithm may be implemented as an Iterative Closest Point (ICP) algorithm. Broadly speaking, the purpose of an ICP algorithm is to fix a reference point cloud, and to transform a source cloud to best match the reference one. The algorithm iteratively revises the transformation (combination of translation and rotation) needed to minimize an error metric. The error metric may be, for example, a distance from the source to the reference point cloud, such as the sum of squared differences between the coordinates of the matched pairs. ICP algorithm can be used for aligning 3D models given an initial guess of the transformation.

It is contemplated that when the revised transformation is determined between data from the LIDAR sensor and data from the 3D map representation, this revised transformation may be used for mapping the bounding box from the system of coordinates of the LIDAR sensor to the system of coordinates of the 3D map representation.

Figure 4:
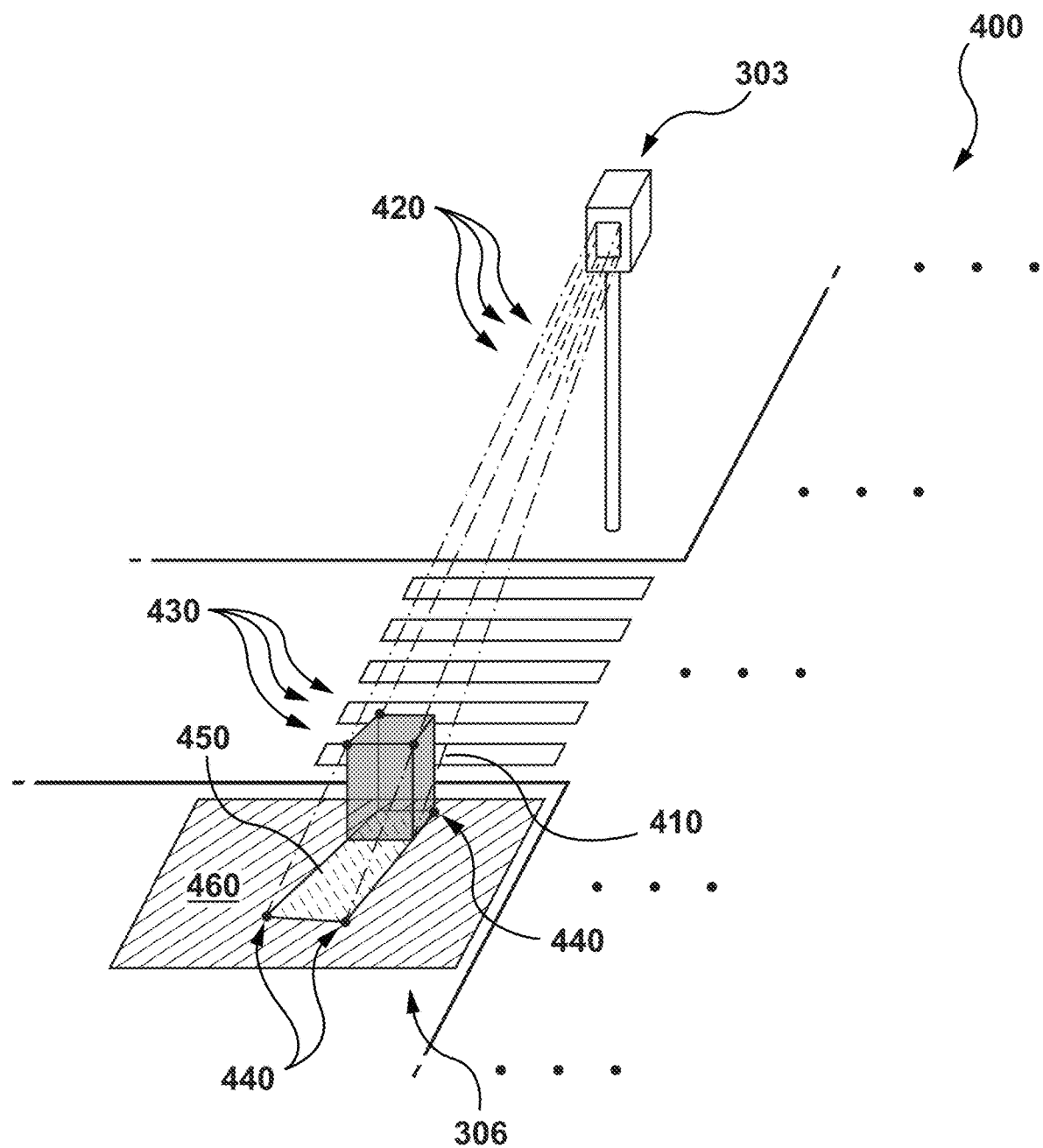
FIG. 4 depicts a perspective view of the 3D map representation of FIG. 3 with a bounding box in accordance with various implementations of the disclosed technology.

In FIG. 4 there is depicted a perspective view 400 of the 3D map representation, instead of the bird's eye view 300, with a bounding box 410 having been mapped to the 3D map representation. As seen, the bounding box 410 is positioned in the waiting area 305.

The mobile robot 306 is configured to determine a visual occlusion zone 450 of the object in the waiting area 306 using the position of the bounding box 410 and the orientation of the visual traffic indicator 303 relative to the waiting area 305. In at least some embodiments, prior to determining a given visual occlusion zone resulting from the bounding box 410, the mobile robot 306 may be configured to confirm that the bounding box 410 is positioned inside the waiting area 305 and/or is in close proximity to the waiting area 305 in the 3D map representation.

Broadly speaking, the visual occlusion zone 450 is an estimated portion of the waiting area 305 in which the visual traffic indicator 303 is occluded from the field of view of the camera sensor of the mobile robot 306 by the object if the mobile robot 306 is located in the estimated portion. In other words, it can be said that if the mobile robot 306 is to move in this estimated portion of the waiting area 305, the camera sensor of the mobile robot 306 will no longer be able to track/monitor the state of the visual traffic indicator 303 due to the object's presence.

To that end, the mobile robot 306 is configured to project at least one corner of the bounding box 410 onto the waiting area 305 by casting at least one ray in the 3D map representation from the visual traffic indicator 303 onto the waiting area 305 and such that this at least one ray passes through a respective corner of the bounding box 410. In FIG. 4, there is depicted a plurality of rays 420 that (i) are cast from the visual traffic indicator 303, (ii) pass through a plurality of corners 430 of the bounding box 410, and (iii) pass through a plurality of points 440 in the waiting area 305. The mobile robot 306 is configured to assign an inner area defined by the plurality of points 440 in the waiting area 305 as the visual occlusion zone 450.

In some embodiments of the present technology, it is contemplated that the mobile robot 306 may be configured to cast the plurality of rays 420 from the visual traffic indicator 303 towards the bounding box 410 to define a "shadow projection" of the bounding box 410 in the waiting area 305. It can be said that the plurality of rays 420 may be cast to, in a sense, project a "shadow" of the bounding box 410 onto the waiting area 305 as if the visual traffic indicator 303 was a "source of light" and the bounding box 410 was an opaque object creating that shadow in the waiting area 305.

In at least some embodiments of the present technology, it can be said that one or more rays are cast from the visual traffic indicator 303 onto the waiting area 305 and such that the one or more rays are tangent to respective corners 430 of the bounding box 410.

It should be noted that the camera sensor of the mobile robot 306 is located at a pre-determined distance above a terrain on which the mobile robot 306 is currently operating. Therefore, in some embodiments, it is contemplated that the mobile robot 306 may use this pre-determined distance when determining the visual occlusion zone 450.

Indeed, assuming the waiting area 305 is located in the 3D map representation directly at the level of the terrain, the mobile robot 306 may use the pre-determined distance for adjusting the area covered by the visual occlusion zone 450. It might be beneficial to adjust the area covered by the visual occlusion zone 405 while considering a height at which the camera sensor of the mobile robot 306 is actually positioned. For example, the pre-determined distance may be used during the projection operation to determine a plurality of adjusted points (instead of the plurality of points 440) in a plane that is parallel to the waiting area 305 and which is located at the pre-determined distance above the waiting area 305 in the 3D map representation. In these embodiments, an adjusted inner area defined by this plurality of adjusted points may be used as a height-adjusted visual occlusion zone. In other words, the pre-determined distance may be used by the mobile robot 306 for determining an "camera-level" visual occlusion zone for the mobile robot 306 by considering the height at which one or more camera sensors are located above the terrain.

The mobile robot 306 is also configured to determine a reduced waiting area 460 as a difference between the waiting area 305 and the visual occlusion area 450. It should be noted that the visual traffic indicator 303 is visible in the field of view of the camera sensor of the mobile robot 306 if the mobile robot 306 is located in the reduced waiting area 460.

The mobile robot 306 is configured to use the reduced waiting area 460 for controlling movement of the mobile robot 306 into and/or through the waiting area 305 so that the camera sensor of the mobile robot 306 is able to continuously track the state of the visual traffic indicator 303. For example, the propulsion system of the mobile robot 306 may be controlled for moving the mobile robot 306 to a given point in the reduced waiting area 460.

Figure 5:
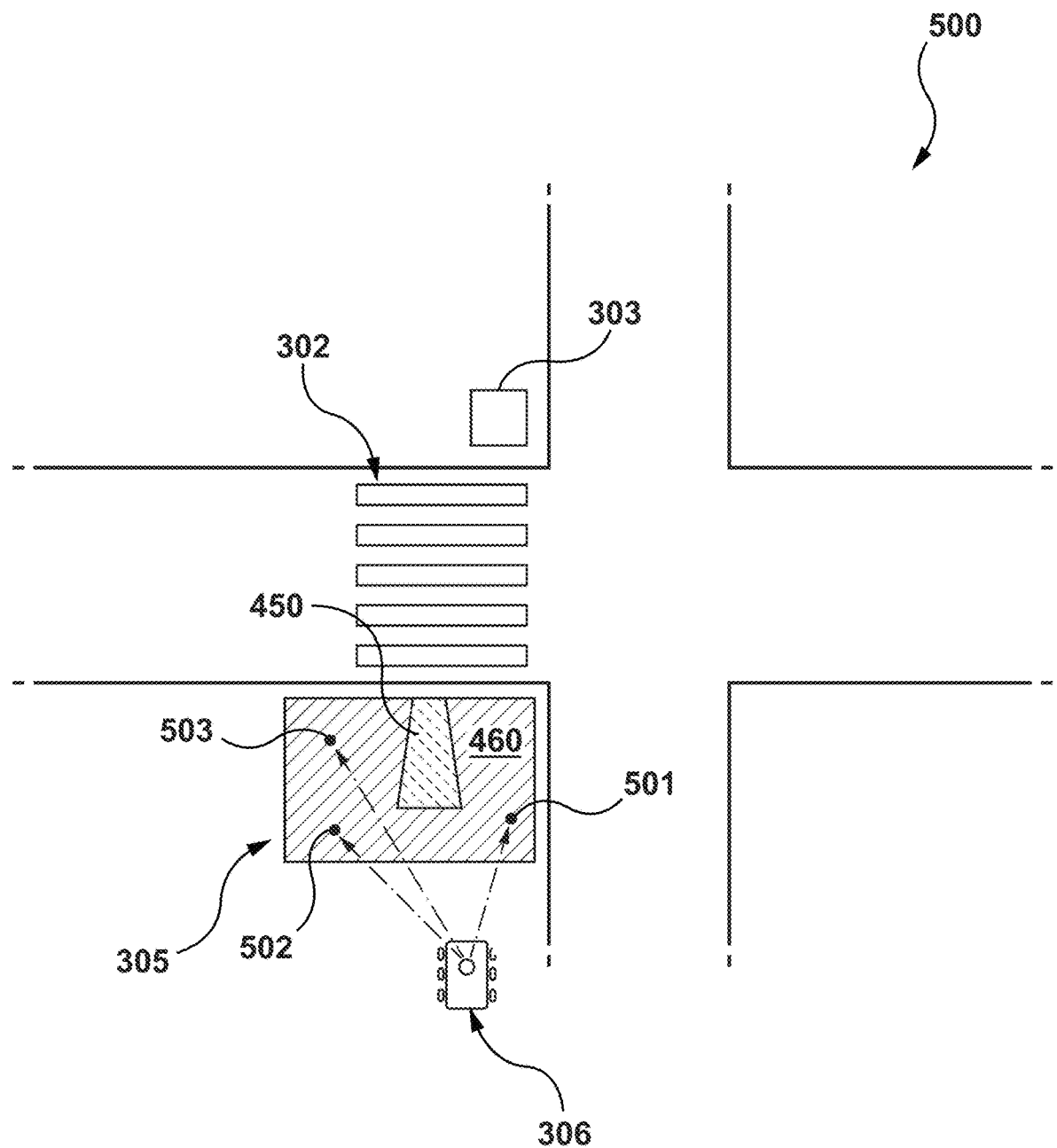
FIG. 5 depicts a bird's eye view of the 3D map representation of FIG. 4 in accordance with various implementations of the disclosed technology.

With reference to FIG. 5, there is depicted a first potential point 501, a second potential point 502, and a third potential point 503 in the waiting area 460. The processor 102 may trigger control of the propulsion system of the mobile robot 306 for moving the mobile robot 306 to a selected point amongst the first potential point 501, the second potential point 502, and the third potential point 503 in the waiting area 460.

In some embodiments, the mobile robot 306 may be configured to compare the reduced waiting area 460 against a pre-determined threshold area. For example, the mobile robot 306 may compare a surface size of the reduced waiting area 460 against a pre-determined surface size threshold value. Without wishing to be bound to any specific theory, developers of the present technology have realized that the surface size of the reduced waiting area 460 may be small (i) in cases where the object is a relatively large object resulting in a large visual occlusion zone, and (ii) in cases where a plurality of objects are detected in the waiting area 305 and result in a plurality of visual occlusion zones in the waiting are 305, which when combined further result in a large combined visual occlusion zone.

In those embodiments where the mobile robot 306 compares the reduced waiting area 460 against the pre-determined threshold area, in response to determining that the reduced waiting area 460 is larger than the pre-determined threshold area, the mobile robot 306 may proceed with triggering control of the propulsion system for moving to a target position in the reduced waiting are 460 and/or moving through the reduced waiting area 460. Further, in response to determining that the reduced waiting area 460 is smaller than the pre-determined threshold area, the mobile robot 306 may proceed with, in a sense, a "more accurate" determination of a visual occlusion zone in the waiting area 305 caused by the presence of the object.

To that end, the mobile robot 306 may be configured to determine a "shell" structure for the object based on the LIDAR data captured by the LDIAR sensor of the mobile robot 306 and use this shell structure instead of the bounding box 410 for determining an other, more accurate, visual occlusion zone in the waiting area 305 caused by the presence of the object.

Figure 6:
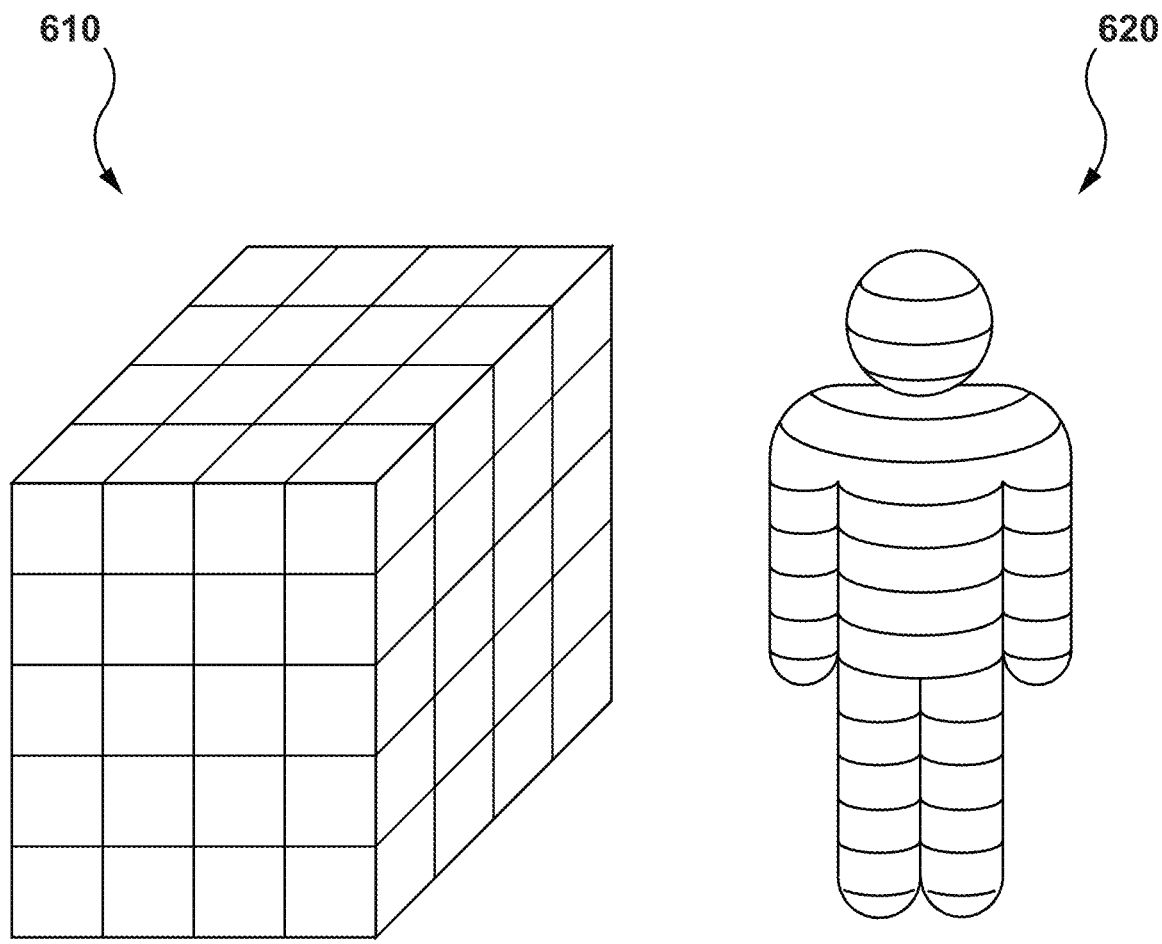
FIG. 6 depicts a bounding box and a shell structure that the computer system of FIG. 1 generates for a same object in accordance with various implementations of the disclosed technology.

In FIG. 6, there is depicted a representation of a bounding box 610 that can be generated by the processor 102 during an object detection procedure, and a representation a shell 630 that the processor 102 may generate for a same object based on the LIDAR data. The manner in which the processor is configured to generate the shell 630 is not particularly limited.

It is contemplated that a given shell generated by the processor 102 for an object may be a convex hull of the object. In some implementations, the processor 102 may be configured to execute the "quickhull method" for computing the convex hull of a finite set of points in the 3D space. For example, such as algorithm may be summarized in the following steps. First, the processor 102 may be configured to find points with minimum and maximum x coordinates, as these will always be part of the convex hull. If many points with the same minimum/maximum x exist, the processor 102 use ones with minimum/maximum y correspondingly. Then, the processor 102 may use the line formed by the two points to divide the set in two subsets of points, which will be processed recursively. Then, the processor 102 may determine the point, on one side of the line, with the maximum distance from the line. This point forms a triangle with those of the line. The points lying inside of that triangle may not be part of the convex hull and can be ignored in the next steps. Then, the processor 102 may repeat the previous two steps on the two lines formed by the triangle. The processor 102 may keep performing the above steps on until no more points are left. In this case, the recursion has come to an end and the points selected constitute the convex hull.

It should be noted that generating the bounding box 610 for a given object can be computationally less expensive and/or may require less time than generating the shell 620 for a same object. However, it should be noted that the bounding box 610 is in a sense, a "rougher" estimation of a shape of a given object than the shell 620 and is generally larger in size than the shell 620.

Therefore, in those embodiments where the reduced waiting area 460 is smaller than the pre-determined threshold area, the mobile robot 306 may be configured to use, instead of the bounding box 410, a given shell of the object that is a more accurate estimation of a shape of the object than the bounding box 410. Using a more accurate estimation of the shape of the object may result in a more accurate estimation of a given visual occlusion zone in the waiting area 305 and/or a more accurate estimation of a given reduced waiting area.

Hence, in some embodiments of the present technology, it can be said that the mobile robot 306 may be configured to perform a "two-step" evaluation process of a reduced waiting area, where during a first step of the two-step evaluation process the mobile robot 306 employs the bounding box 410 for determining the reduced waiting area 460, and where during a second step of the two-step valuation process the mobile robot 306 employs a given shell of the same object (instead of the bounding box 410) for determining an other, more accurate, reduced waiting area.

As such, it is contemplated that the mobile robot 306 may be configured to map the given shell of the object from the system of coordinates of the LIDAR sensor (and/or the LIDAR point cloud) to the system of coordinates of the 3D map representation. This may be performed in a similar manner to how the mobile robot 306 is configured to map the bounding box 410 from the system of coordinates of the LIDAR sensor (and/or the LIDAR point cloud) to the system of coordinates of the 3D map representation. Also, the mobile robot 306 may be configured to determine an other visual occlusion zone of the object in the waiting area 305 using the location of the shell (instead of the bounding box 410) and the orientation of the visual traffic indicator 303 relative to the waiting area 305, similarly to how the mobile robot is configured to generate the visual occlusion zone 450 of the object using the location of the bounding box 410 and the orientation of the visual traffic indicator 303. The mobile robot 306 may also be configured to determine an other reduced waiting area as a difference between the waiting area 305 and the other visual occlusion area of the shell. It should be noted that the other reduced waiting area is likely to be larger to the reduced waiting area 460 since the other visual occlusion zone computed based on the shell is likely to be smaller than the visual occlusion zone 450 computed based on the bounding box 410.

Once the other reduced waiting area is determined by the mobile robot 306, the mobile robot 306 may compare the other reduced waiting area against the pre-determined threshold area. In response to the other reduced waiting area being above the pre-determined threshold area, the processor may trigger control the propulsion system of the mobile robot 306 for moving the mobile robot 306 to the other reduced waiting area. Otherwise, the mobile robot 306 may wait at his current position until one or more objects move away from the waiting area 305.

Figure 7:
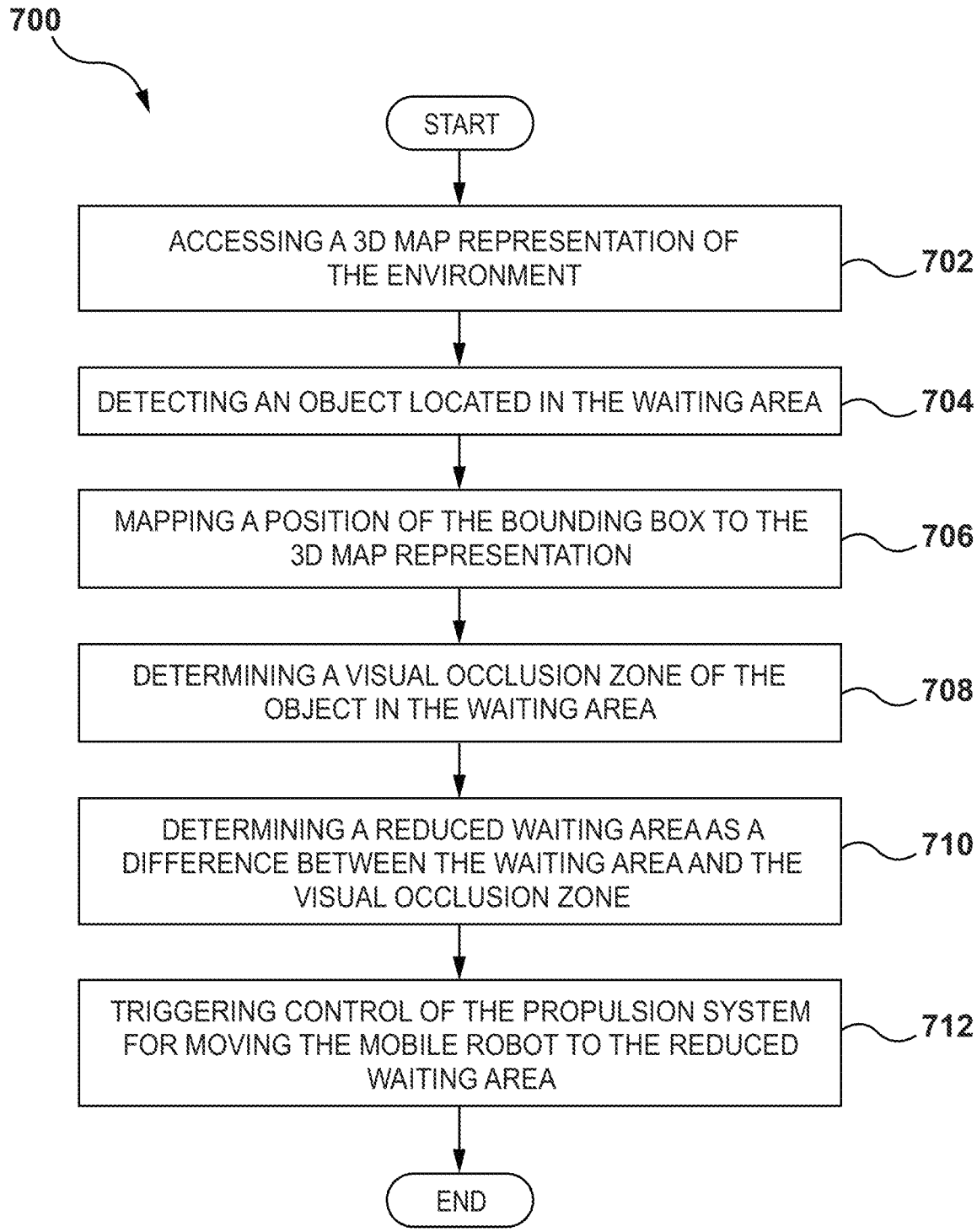
FIG. 7 depicts a flowchart of a method executable in accordance with various implementations of the disclosed technology.

In FIG. 7 shows a flowchart of a method 700 of controlling the mobile robot 306 in accordance with various implementations of the disclosed technology. The mobile robot 306 has a LIDAR sensor, a camera sensor, and a propulsion system for propelling the mobile robot in an environment. The mobile robot 306 also has a processor communicatively coupled with the LIDAR sensor, the camera sensor, and the propulsion system. The method 700 may be executable by the processor associated with the mobile robot 306.

STEP 702: Accessing a 3D Map Representation of the Environment

The method 700 begins at step 702 with the processor 102 accessing a 3D map representation of the environment in which the mobile robot 306 is currently operating. The 3D map representation includes indications of the crosswalk 302, the waiting area 305, and the visual traffic indicator 303 (see FIG. 3). The 3D map representation indicative of a position of the visual traffic indicator and its orientation relative to the waiting area.

Broadly speaking, a 3D map representation has a system of coordinates for locating various objects found in the environment such as poles, mailboxes, curbs, roads, buildings, fire hydrants, traffic cones, traffic lights, crosswalks, trees, fences, billboards, landmarks, and the like. More particularly, the 3D map representation contains information indicative of a position of a given object in the system of coordinates of the 3D map and an orientation of the given object in the system of coordinates the 3D map. It can also be said that the 3D map representation may contain information indicative of a relative position and relative orientation of a first one from a pair of objects with respect to a second one from the pair of objects. In at least some embodiments, the 3D map representation may include native objects and artificial objects.

STEP 704: Detecting an Object Located in the Waiting Area

The method 700 continues to step 704 with the processor 102 detecting an object located in the waiting area 305, thereby generating the bounding box 410. It should be noted that the processor 102 is configured to generate the bounding box 410 for the object by using at least one of camera data from the camera sensor and LIDAR data from the LIDAR sensor.

For example, the processor 102 may input the at least one of the camera data (image data) and LIDAR data (point cloud data) into the ODNN configured to detect presence of objects and identify their location by constructing bounding boxes around the present objects.

STEP 706: Mapping a Position of the Bounding Box to the 3D Map Representation The method 700 continues to step 706 with the processor 102 mapping a position of the bounding box 410 to the 3D map representation. It is noted that in some embodiments the mobile robot 306 is configured to map the position of the bounding box from the system of coordinates of the LIDAR sensor (and/or of the LIDAR point cloud) to its position in the system of coordinates of the 3D map representation.

To that end, the mobile robot 306 may be configured to apply a transformation matrix onto the position of the bounding box 410 in the system of coordinates of the LIDAR sensor for determining the position of the bounding box 410 in the system of coordinates of the 3D map representation.

STEP 708: Determining a Visual Occlusion Zone of the Object in the Waiting Area The method 700 continues to step 708 with the processor 102 configured to determine the visual occlusion zone 450 in the waiting area 305. For example, the processor 102 may use the position of the bounding box 410 and the orientation of the visual traffic indicator 303 relative to the waiting area 305 for determining the visual occlusion zone 450.

In at least some embodiments of the present technology, the processor 102 may be configured to execute a ray tracing algorithm for generating a shadow projection of the bounding box 410 in the waiting area 305 and where the one or more rays are traced/casted from the visual traffic indicator.

In at least one embodiment, the processor 102 may be configured to project at least one corner of the bounding box 410 onto the waiting area 305 by casting a ray in the 3D map representation from the visual traffic indicator 303 onto the waiting area 305 such that the ray passes through the at least one of the corners of the bounding box 410.

In some embodiments, the processor 102 may be configured to cast more than one ray in the 3D map representation. For example, the processor 102 may cast a plurality of rays from the visual traffic indicator 303 towards the bounding box 410 to define the shadow projection of the bounding box 410 in the waiting area 305.

In alternative embodiments of the present technology, during the determination of the visual occlusion zone 450, the processor 102 may also consider the height at which the camera sensor of the mobile robot 306 is positioned off the ground surface. As explained above, in these embodiments, the processor 102 may be configured to use a pre-determined distance at which the camera sensor is located above the ground for determining a visual occlusion zone located at the pre-determined distance above the waiting area 305.

It is contemplated that the visual occlusion zone 450 is an estimated portion of the waiting area 305 in which the visual traffic indicator 303 is occluded from the field of view of the camera sensor by the object if the mobile robot 306 is located in the estimated portion.

STEP 710: Determining a Reduced Waiting Area as a Difference Between the Waiting Area and the Visual Occlusion Zone The method 700 continues to step 710 with the processor 102 configured to determine a reduced waiting area 460 as a difference between the waiting area 305 and the visual occlusion zone 450.

STEP 712: Triggering Control of the Propulsion System for Moving the Mobile Robot to the Reduced Waiting Area The method 700 continues to step 712 with the processor 102 configured to trigger control of the propulsion system for moving the mobile robot 306 to the reduced waiting area 460. In some embodiments, the processor 102 may trigger movement for the mobile robot 306 to stop in the reduced waiting area 460 and monitor a current state of the visual traffic indicator 303. In other embodiments, the processor 102 may trigger movement for the mobile robot 306 to move through the reduced waiting area 460 when engaging the crosswalk 302.

Modifications and improvements to the above-described implementations of the present technology may become apparent to those skilled in the art. For example, although the prediction model is described as being used to generate scores based on dynamic objects, while the analytical model is described as being used to generate scores based on static objects, it will be understood that these boundaries may not be absolute. For example, an object that may normally be classified as a dynamic object may not be moving at the time that the robotic vehicle is operating in the vicinity. Examples of this are parked cars or people who are standing in a constant location, e.g., waiting for a bus. In this case, although these "objects" are static, in that they are not moving, they might still be handled by the prediction model.

The foregoing description is intended to be exemplary rather than limiting. The scope of the present technology is therefore intended to be limited solely by the scope of the appended claims.

The invention claimed is:

1. A mobile robot having a Light Detection and Ranging (LIDAR) sensor, a camera sensor having a field of view, and a propulsion system for propelling the mobile robot in an environment, a processor being communicatively coupled with the LIDAR sensor, the camera sensor, and the propulsion system, the processor being configured to:

access a 3D map representation of the environment including a respective indication of a crosswalk, a waiting area for the crosswalk, and a visual traffic indicator for the crosswalk,
　　　　the 3D map representation indicative of a position of the visual traffic indicator and its orientation relative to the waiting area;
　　detect an object located in the waiting area by using at least one of camera data from the camera sensor and LIDAR data from the LIDAR sensor, thereby generating a bounding box of the object;
　　map a position of the bounding box to the 3D map representation;
　　determine a visual occlusion zone of the object in the waiting area using the position of the bounding box and the orientation of the visual traffic indicator relative to the waiting area,
　　　　the visual occlusion zone being an estimated portion of the waiting area in which the visual traffic indicator is occluded from the field of view of the camera sensor by the object if the mobile robot is located in the estimated portion;
　　determine a reduced waiting area as a difference between the waiting area and the visual occlusion area,
　　　　the visual traffic indicator being visible in the field of view of the camera sensor if the mobile robot is located in the reduced waiting area; and
　　trigger control of the propulsion system for moving the mobile robot to the reduced waiting area.

2. The mobile robot of claim 1, wherein the processor is further configured to:
　　compare the reduced waiting area to a pre-determined threshold area; and
　　in response to the reduced waiting area being above the pre-determined threshold area, control the propulsion system for moving the mobile robot to the reduced waiting area;
　　in response to the reduced waiting area being below the pre-determined threshold area:
　　　　determine a shell of the object using the LIDAR data of the LIDAR sensor, the shell being a more accurate estimation of a shape of the object than the bounding box;
　　　　map a position of the shell on the 3D representation;
　　　　determine an other visual occlusion zone of the object in the waiting area using the position of the shell and the orientation of the visual indicator relative to the waiting area,
　　　　　　the other visual occlusion zone being an other estimated portion of the waiting area in which the visual traffic indicator will be occluded from the field of view of the camera sensor by the object if the mobile robot is located in the other estimated portion,
　　　　　　　　the other estimated portion being smaller than the estimated portion;
　　　　determine an other reduced waiting area as a difference between the waiting area and the other visual occlusion area,
　　　　　　the visual traffic indicator being visible in the field of view of the camera sensor is the mobile robot is located in the other reduced waiting area;
　　　　compare the other reduced waiting area to the pre-determined threshold area; and
　　　　in response to the other reduced waiting area being above the pre-determined threshold area:
　　　　　　trigger control the propulsion system for moving the mobile robot to the other reduced waiting area.

3. The mobile robot of claim 1, wherein the processor is further configured to locally store at least a portion of the 3D map representation.

4. The mobile robot of claim 1, wherein to detect, the processor is further configured to employ an Object Detection Neural Network (ODNN) onto the at least one of the camera data and the LIDAR data.

5. The mobile robot of claim 1, wherein to determine the visual occlusion zone the processor is further configured to project at least one corner of the bounding box onto the waiting area by casting a ray in the 3D map representation from the visual traffic indicator onto the waiting area and such that the ray is passes through the at least one of the corners of the bounding box.

6. The mobile robot of claim 5, wherein the ray is more than one ray, the processor being configured to cast the more than one rays from the visual traffic indicator towards the bounding box to define a shadow projection of the bounding box in the waiting area, the shadow projection of the bounding box representing the visual occlusion zone.

7. The mobile robot of claim 1, wherein the camera sensor is located at a pre-determined distance above a terrain on which the mobile robot moves, and wherein the processor is further configured to use the pre-determined distance to determine the visual occlusion zone, the visual occlusion zone being located at the pre-determined distance above the waiting area.

8. The mobile robot of claim 1, wherein the processor is further configured to control the propulsion system for stopping the mobile robot in the reduced waiting area.

9. The mobile robot of claim 1, wherein the processor is further configured to monitor a state of the visual traffic indicator.

10. The mobile robot of claim 1, wherein the visual traffic indicator is a traffic light.

11. The mobile robot of claim 1, wherein the processor is an onboard processor of the mobile robot.

12. The mobile robot of claim 1, wherein the processor is a remote processor of a server, the server being communicatively coupled with the mobile robot.

13. A method for controlling a mobile robot in an environment, comprising:
　　accessing a 3D map representation of the environment including a respective indication of a crosswalk, a waiting area for the crosswalk, and a visual traffic indicator for the crosswalk,
　　　　the 3D map representation indicative of a position of the visual traffic indicator and its orientation relative to the waiting area
　　detecting, using at least one sensor of the mobile robot, an object in the waiting area, thereby generating a bounding box of the object:
　　casting, in the 3D map representation, two rays from the visual traffic indicator towards the bounding box to define a shadow projection of the bounding box in the waiting area, the shadow projection representing a visual occlusion zone of the object in the waiting area,
　　　　the visual occlusion zone being an estimated portion of the waiting area in which the visual traffic indicator is occluded from the field of view of the camera sensor by the object if the mobile robot is located in the estimated portion;

determining a reduced waiting area by subtracting the visual occlusion zone from the waiting area;

in response to the reduced waiting area being above a pre-determined threshold area, controlling the mobile robot so that the robot stops inside the reduced waiting area, the visual traffic indicator being visible in the field of view of the camera sensor when the mobile robot is located in the reduced waiting area.

14. The method of claim 13, wherein in response to the reduced waiting area being lower than the pre-determined threshold area, generating, using the at least one sensor, a shell for object, the shell being a more accurate estimation of a shape of the object than the bounding box;

casting, in the 3D map representation, two rays from the visual traffic indicator towards the shell to define an other shadow projection of the shell in the waiting area, the other shadow projection representing an other visual occlusion zone of the object in the waiting area, the other visual occlusion zone being smaller than the visual occlusion zone;

determining an other reduced waiting area by subtracting the other visual occlusion zone from the waiting area;

in response to the other reduced waiting area being above the pre-determined threshold area, controlling the mobile robot so that the robot stops inside the other reduced waiting area.

15. The method of claim 13, wherein the method further comprises:

continuously tracking a state of the visual traffic indicator using at least one camera sensor of the mobile robot.

16. A method of controlling a mobile robot having a Light Detection and Ranging (LIDAR) sensor, a camera sensor having a field of view, and a propulsion system for propelling the mobile robot in an environment, a processor being communicatively coupled with the LIDAR sensor, the camera sensor, and the propulsion system, the method being executable by the processor, the method comprising:

accessing a 3D map representation of the environment including a respective indication of a crosswalk, a waiting area for the crosswalk, and a visual traffic indicator for the crosswalk, the 3D map representation indicative of a position of the visual traffic indicator and its orientation relative to the waiting area;

detecting an object located in the waiting area by using at least one of camera data from the camera sensor and LIDAR data from the LIDAR sensor, thereby generating a bounding box of the object;

mapping a position of the bounding box to the 3D map representation;

determining a visual occlusion zone of the object in the waiting area using the position of the bounding box and the orientation of the visual traffic indicator relative to the waiting area, the visual occlusion zone being an estimated portion of the waiting area in which the visual traffic indicator is occluded from the field of view of the camera sensor by the object if the mobile robot is located in the estimated portion;

determining a reduced waiting area as a difference between the waiting area and the visual occlusion area, the visual traffic indicator being visible in the field of view of the camera sensor if the mobile robot is located in the reduced waiting area; and triggering control of the propulsion system for moving the mobile robot to the reduced waiting area.

17. The method of claim 16, wherein the method further comprises:

comparing the reduced waiting area to a pre-determined threshold area; and in response to the reduced waiting area being above the pre-determined threshold area, controlling the propulsion system for moving the mobile robot to the reduced waiting area;

in response to the reduced waiting area being below the pre-determined threshold area:

determining a shell of the object using the LIDAR data of the LIDAR sensor, the shell being a more accurate estimation of a shape of the object than the bounding box;

mapping a position of the shell on the 3D representation;

determining an other visual occlusion zone of the object in the waiting area using the position of the shell and the orientation of the visual indicator relative to the waiting area, the other visual occlusion zone being an other estimated portion of the waiting area in which the visual traffic indicator will be occluded from the field of view of the camera sensor by the object if the mobile robot is located in the other estimated portion, the other estimated portion being smaller than the estimated portion;

determining an other reduced waiting area as a difference between the waiting area and the other visual occlusion area, the visual traffic indicator being visible in the field of view of the camera sensor is the mobile robot is located in the other reduced waiting area;

comparing the other reduced waiting area to the pre-determined threshold area; and in response to the other reduced waiting area being above the pre-determined threshold area:

triggering control the propulsion system for moving the mobile robot to the other reduced waiting area.

18. The method of claim 16, wherein at least a portion of the 3D map representation is locally stored.

19. The method of claim 16, wherein the detecting includes employing an Object Detection Neural Network (ODNN) onto the at least one of the camera data and the LIDAR data.

20. The method of claim 16, wherein the determining the visual occlusion zone includes projecting at least one corner of the bounding box onto the waiting area by casting a ray in the 3D map representation from the visual traffic indicator onto the waiting area and such that the ray is passes through the at least one of the corners of the bounding box.

* * * * *